(12) United States Patent
Brinker

(10) Patent No.: US 11,754,463 B2
(45) Date of Patent: Sep. 12, 2023

(54) REMOTE TOWER MONITORING SYSTEM

(71) Applicant: David G. Brinker, Metamora, IL (US)

(72) Inventor: David G. Brinker, Metamora, IL (US)

(73) Assignee: Smart Tower Systems LLC, Peoria, IL (US)

( * ) Notice: Subject to any disclaimer, the term of this patent is extended or adjusted under 35 U.S.C. 154(b) by 485 days.

(21) Appl. No.: 16/515,264

(22) Filed: Jul. 18, 2019

(65) Prior Publication Data

US 2020/0025644 A1 Jan. 23, 2020

Related U.S. Application Data

(60) Provisional application No. 62/699,951, filed on Jul. 18, 2018.

(51) Int. Cl.
*G01M 5/00* (2006.01)
*G08B 21/18* (2006.01)

(52) U.S. Cl.
CPC ........ *G01M 5/0025* (2013.01); *G01M 5/0066* (2013.01); *G08B 21/182* (2013.01)

(58) Field of Classification Search
CPC ..... G01M 5/0025; G01M 13/00; G01S 17/87; G01B 21/02; G01B 21/32; G10L 15/22;
(Continued)

(56) References Cited

U.S. PATENT DOCUMENTS

| 4,956,999 A | 9/1990 | Bohannan et al. |
| 2004/0108729 A1* | 6/2004 | Wobben ................ F03D 7/0296 290/44 |

(Continued)

FOREIGN PATENT DOCUMENTS

| CN | 201289391 Y | 8/2009 |
| CN | 102506986 A | 6/2012 |

(Continued)

OTHER PUBLICATIONS

International Search Report for related International Application No. PCT/US2019/042345 dated Nov. 7, 2019.
(Continued)

*Primary Examiner* — Brandi N Hopkins
(74) *Attorney, Agent, or Firm* — DICKINSON WRIGHT PLLC; Steven C. Hurles

(57) ABSTRACT

A tower monitoring system for monitoring a remote tower for structural evaluation and analysis. The tower monitoring system includes a sensor unit that takes tower data readings that include displacement readings. The sensor unit provides the tower data readings to a ground control unit near the tower. A remote server is in communication with the ground control unit and includes a secondary source of data, such as historical data of the tower, current data or historic data from nearby towers, and nearby weather and geological data. The monitoring system implements a modal analysis to determine contributions to the displacement readings and alarms an operator if the modal readings indicate structural stress beyond a predetermined threshold. Data is saved and can be used in a trend analysis to review any changes in the tower displacement readings over a period of time.

20 Claims, 9 Drawing Sheets

(58) Field of Classification Search
CPC ... A61B 5/0205; A61B 5/0022; A61B 5/0002; A61B 34/10; A61B 5/02055; G08B 21/0446; G08B 5/38; G01D 21/02; G01T 1/02; G06F 3/014; G06F 1/163; G06F 30/23; G06F 3/011; G16H 20/30; A63B 24/0062; F03D 17/00
See application file for complete search history.

(56) References Cited

U.S. PATENT DOCUMENTS

| | | | | |
|---|---|---|---|---|
| 2012/0253697 | A1* | 10/2012 | Frankenstein | G05B 23/0254 702/39 |
| 2016/0286286 | A1* | 9/2016 | Brinker | H04Q 9/00 |
| 2017/0220718 | A1 | 8/2017 | Freeman et al. | |

FOREIGN PATENT DOCUMENTS

| | | |
|---|---|---|
| CN | 106949936 A | 7/2017 |
| CN | 107387333 A | 11/2017 |
| CN | 107939617 A | 4/2018 |
| CN | 207485608 U | 6/2018 |
| EP | 2112375 A2 | 10/2009 |
| ES | 2531737 B1 | 1/2016 |
| JP | H02212734 A | 8/1990 |
| KR | 20160072559 A | 6/2016 |
| WO | 2015040483 A1 | 3/2015 |

OTHER PUBLICATIONS

Stefano Alessandro De et al: "Structural health monitoring of historical heritage in Italy: some relevant experiences", Journal of Civil Structural Health Monitoring, Springer Berlin Heidelberg, Berlin/Heidelberg, vol. 6, No. 1, Feb. 23, 2016 (Feb. 23, 2016), pp. 83-106, XP035968881, ISSN: 2190-5452, DOI: 10.1007/S13349-016-0154-Y [retrieved on Feb. 23, 2016].

EP Application No. 19838410.9, Extended European Search Report, dated Mar. 23, 2022, 9 pages.

* cited by examiner

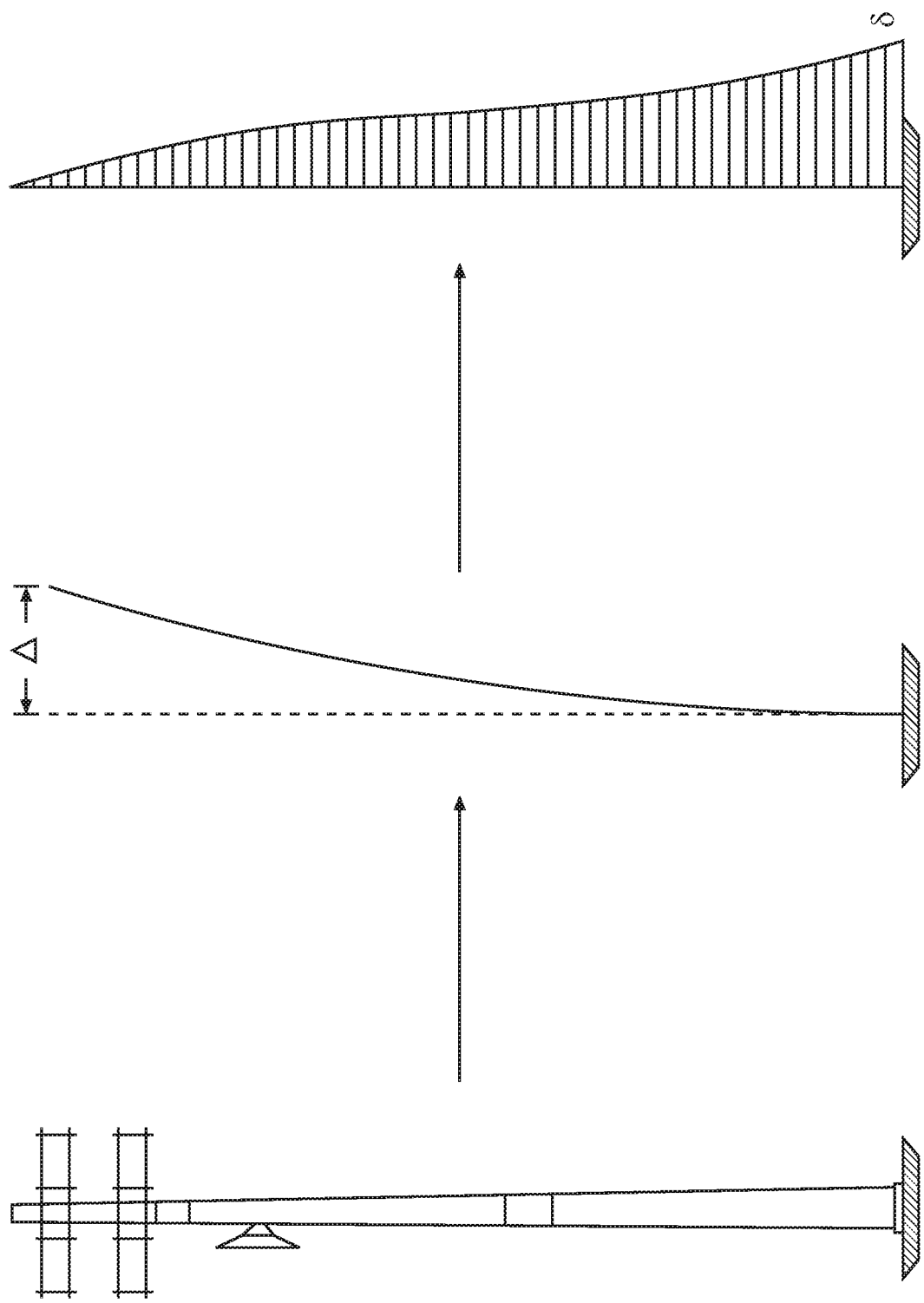

REMOTE TOWER MONITORING SYSTEM

CROSS-REFERENCE TO RELATED APPLICATION

This Patent Application claims the benefit of and priority to U.S. Provisional Patent Application Ser. No. 62/699,951 filed on Jul. 18, 2018, and titled "Remote Tower Monitoring System," the entire disclosure of which is hereby incorporated by reference.

BACKGROUND OF THE INVENTION

1. Field of the Invention

The present invention is related generally to systems for monitoring towers and more particularly systems to provide data for structural evaluation and analysis.

2. Related Art

Towers are employed for a plurality of applications. For example, towers are employed to transmit resources such as energy, oil, water, etc. or information from a first location to another. The information being propagated from a first point to a second point may be network related, energy related, communications related, or the like. In another context, a tower may be situated to collect information about a location, such as weather or other environmental information. Towers may be situated to support equipment, such as wind turbines or the like or to support conductors transmitting electricity. Towers may serve as a smoke stack or other similar functions in power generating stations, factories or the like. Towers in this application, may be, but are not limited to, latticed towers, guyed masts and pole structures.

A tower may be situated in numerous contexts, environments, and locations. Thus, the tower may be affected by various external phenomena, such as natural disasters, environmental factors, physical contact, potentially destructive wind oscillations leading to fatigue failures and normal wear and tear. Thus, as a tower interacts with the various external phenomena, the tower's efficacy may be compromised. In certain situations, if a tower is misaligned, the tower's ability to be a host or provide a service may either be lessened or effectively be cancelled.

Conventional techniques for handling situations as described above require engaging a specialist to frequently inspect each tower, or fixing a tower after the tower has become inoperable. In the former case, engaging a specialist may be costly, ineffective, and a non-robust solution. Further, certain towers may be in areas that are geographically remote, and thus, not very easy to travel to.

Further, in the latter case, if towers are repaired after a problem is detected, considerable downtime may be experienced. Because the tower is compromised (and in some cases beyond repair), the system associated with the tower may be rendered inoperable until the tower is either repaired or replaced.

Conventional techniques for structural health monitoring for detecting deformations are directed to rotational or tilting detection using tilt sensors that are not reliable on flexible structures, such as a tower, as a result of acceleration during displacement corrupting the sensor's measurements. Serious structural health issues may be missed without detecting tower displacements as well as rotations, and thus, these problems may be left unaddressed in detecting, monitoring, and repairing issues affecting tower implementations.

Thus, the conventional techniques for addressing tower related problems associated with structural integrity and performance are lacking for at least the above-stated reasons.

SUMMARY OF THE INVENTION

In one aspect of the present invention, a tower monitoring system is provided. The tower monitoring system comprises a sensor unit for attachment to a tower. The sensor unit includes at least one displacement sensor to obtain displacement readings reference to the principle axes of the structure. The system further provides a remote server in communication with the sensor unit for receiving and saving the displacement readings. A processor is configured to review the displacement readings and perform a modal analysis that separates the mean displacement from the displacements due to each dominant mode of oscillation of the tower.

In accordance with another aspect of the invention, the processor makes correlations to local environmental factors and alerts are generated when thresholds of displacements important to the health of operation of the tower are exceeded.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIGS. 6A through 6C are a series of steps in accordance with the subject disclosure for obtaining a calculation of stresses or collecting data for a profile on the remote tower as a result of wind forces;

DESCRIPTION OF THE ENABLING EMBODIMENT

Referring to the Figures, wherein like numerals indicate corresponding parts throughout the several views, one aspect of the present invention is related to a tower monitoring system 10 that is capable of monitoring and analyzing the structural health of the tower 12 in real-time and/or near real-time and providing historical data for trend analysis or other evaluations. As discussed in further detail below, the system 10 is uniquely capable of measuring the magnitude and direction of lateral displacements and twist and sway rotations, permanent deformations, destructive oscillations and is capable of performing a modal analysis to evaluate the dynamic responses of the tower to external forces. Such external forces include wind, ice and earthquake forces as well as other, less regular forces like impacts, tower climbers, construction activity, wildlife, and others.

Figure 1:
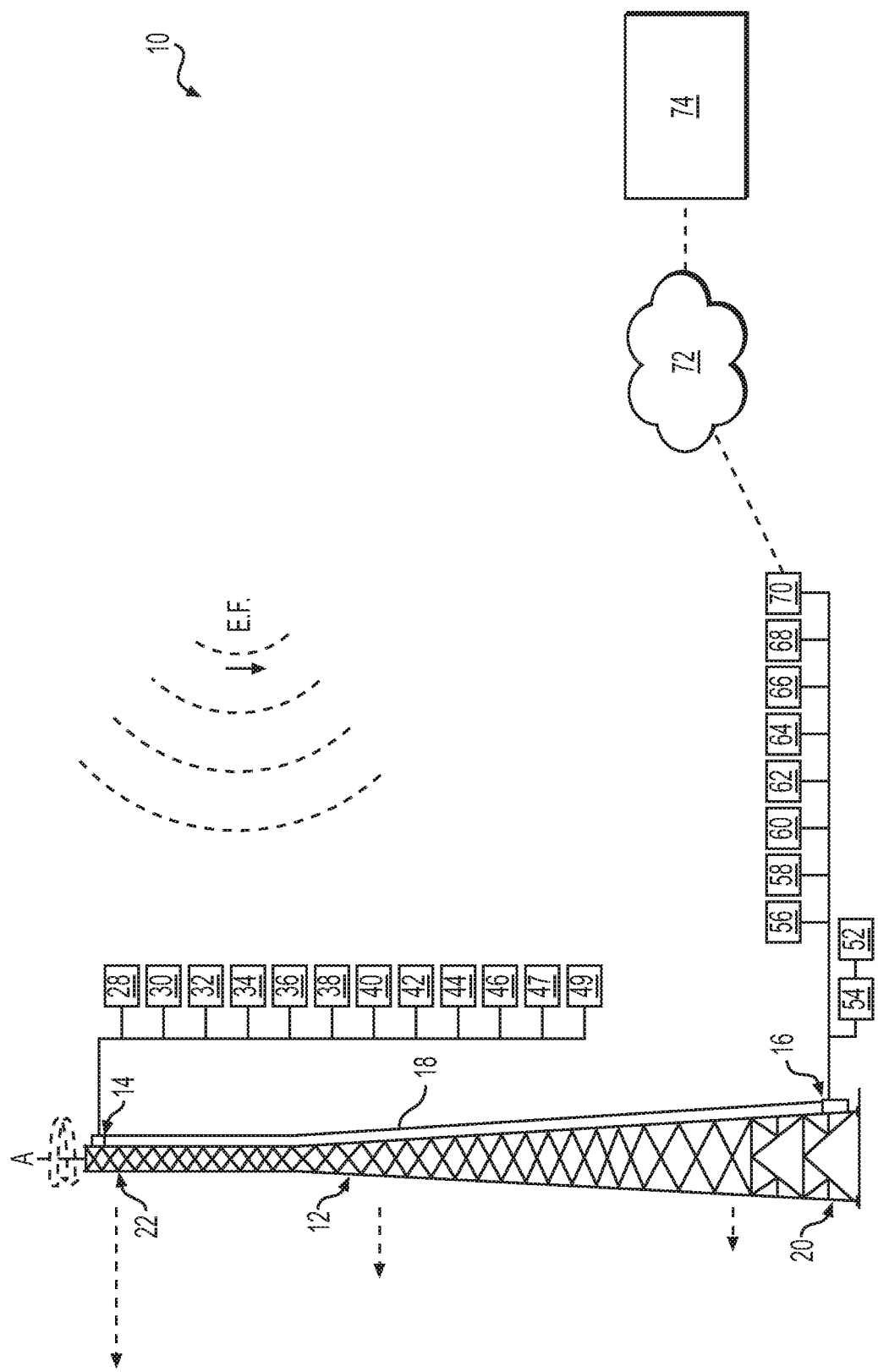
FIG. 1 is a schematic view of the remote tower monitoring system that illustrates a remote tower having a sensor unit and a ground control unit (GCU) that receive and transmit data relating to the structural health of the remote tower.
Figure 2:
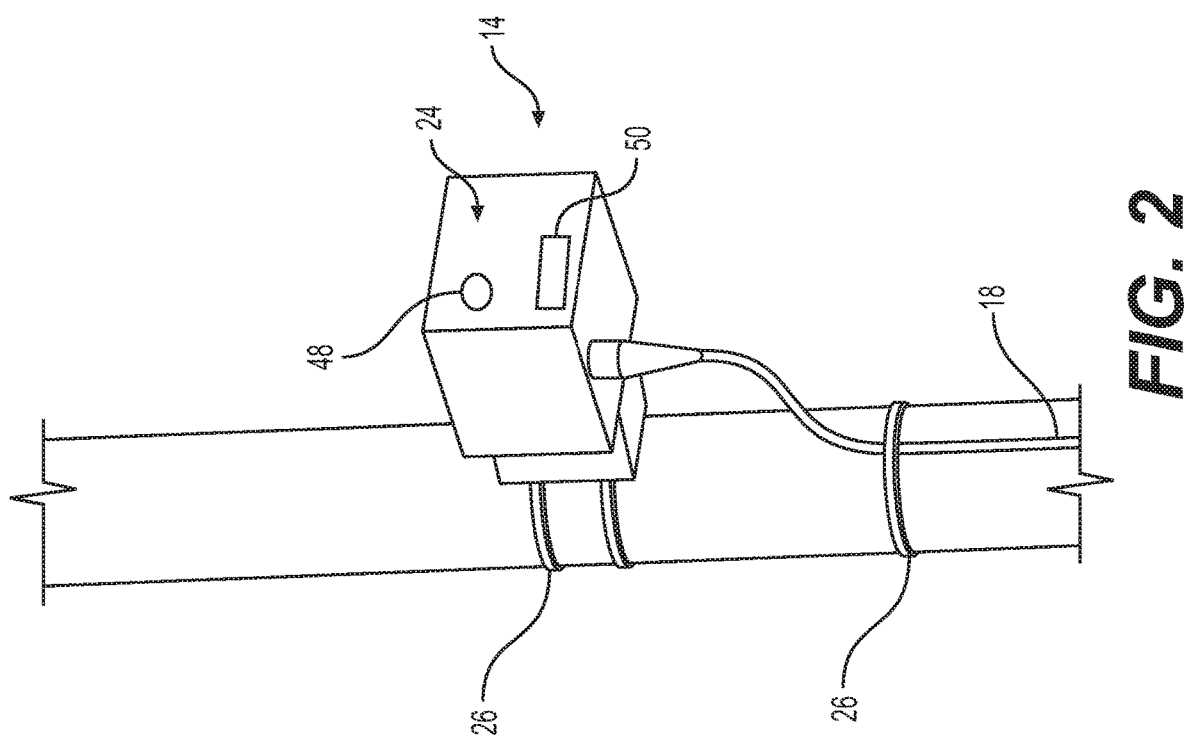
FIG. 2 is a close-up perspective view of the sensor unit contained within a protective housing near a top portion of the remote tower.
Figure 3:
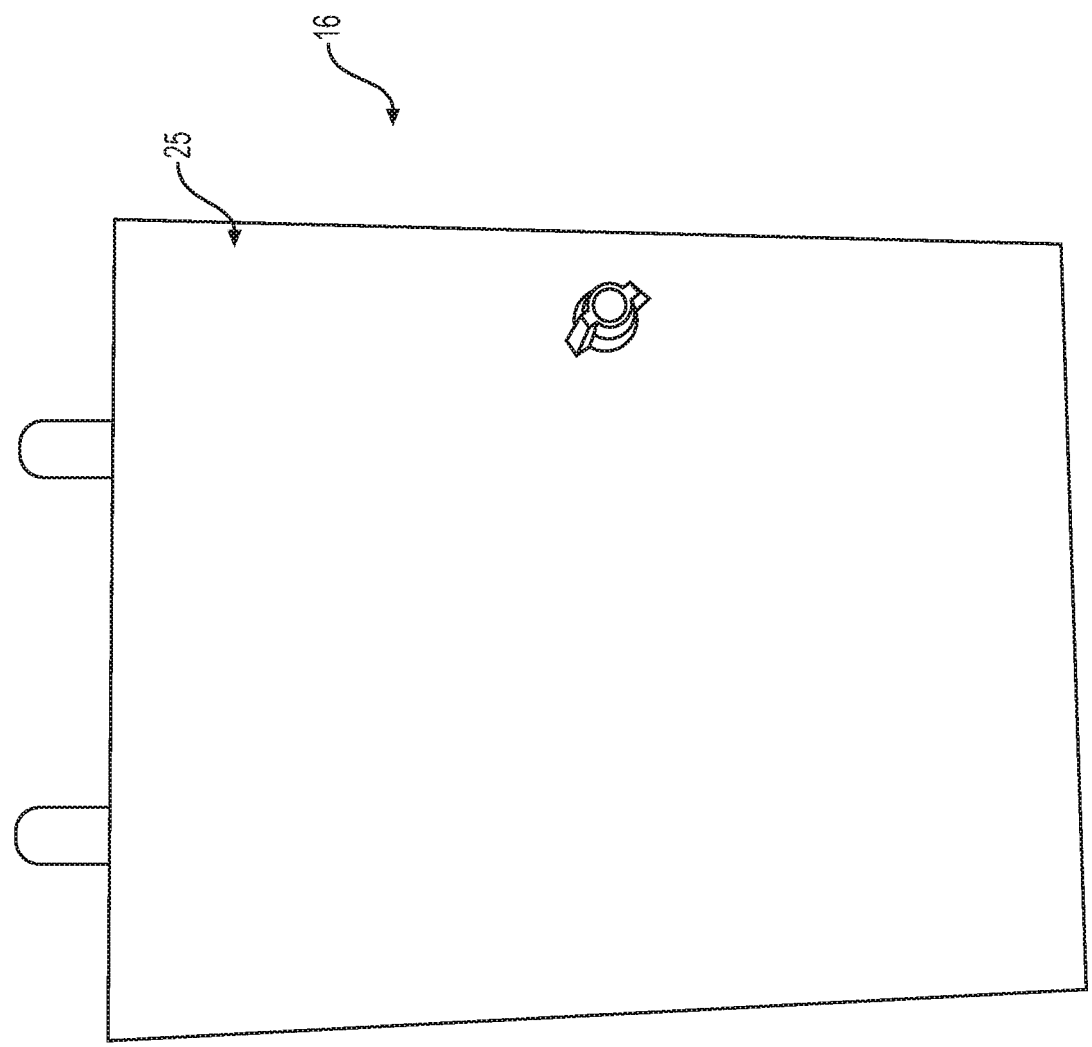
FIG. 3 is a close-up perspective view of the GCU contained within a protective GCU housing near a bottom portion of the remote tower.

Referring initially to FIGS. 1 through 3, aspects of the tower monitoring system 10 are shown in accordance with one example embodiment. The system 10 includes a sensor unit 14, a ground control unit 16 (GCU), and a cable 18 for transmitting power and data between the sensor unit 14 and the GCU 16. The data can include new software, updates, readings, etc. The cable 16 is also used for rebooting or uploading of new software from remote computer to GCU and sensor. Generally speaking, the tower 12 will have been initially erected along an axis A that extends vertically from the ground. The axis A is located along the center of gravity of the tower 12 such that the weight of the tower 12 is distributed near equilibrium around the axis A. The tower 12 is generally maintained along the axis A by one or more supporting structures, such as via a connection to an underground foundational structure and/or a series of anchored guy-wires (not shown). The tower 12 includes a bottom portion 20 located on or adjacent to the ground and a top potion 22, located oppositely from the bottom portion 20. Lateral displacements of the tower 12 will generally have a greater amplitude closer to the top portion 22 as indicated by the arrows in phantom. It should be appreciated that the term "tower" can include other structures such as buildings and bridges without departing from the scope of the subject disclosure.

The sensor unit 14 is preferably located near the top portion 22 of the tower 12. The sensor unit 14 includes a weather resistant housing 24 (generally indicated in FIG. 2) that is mounted onto the tower 12 with straps 26 and/or alternative methods such as bolts. The cable 18 may also be secured to the tower 12 via the straps 26. The connection between the housing 24, the cable 18, and senor unit 14 are designed for operation in high radio frequency energy and lightning prone environments such as on communication towers and do not interfere with any electronic equipment that may be supported by the tower 12.

The sensor unit 14 contains at least one but preferably a plurality of sensors. While not an exhaustive list, the plurality of sensors include displacement and environmental sensors that can include an accelerometer 28 (such as a 3-axis accelerometer), a temperature sensor 30, a pressure sensor 32, a gyroscope 34, an inclinometer 36, ice sensor 38, a humidity sensor 40, a precipitation sensor 42, a lightening sensor 44, a magnetometer 46, other displacement sensors 47, and other environmental sensors 49. It is preferable that the displacement sensors take continuous displacement readings that relate to a magnitude of tower displacement (lateral, sway, twist) and that the environmental sensors take environmental readings that relate to a magnitude of an environmental factor that contributes to the displacement. One environmental factor is shown in FIG. 1 as a series of phantom arcs and is designated "E.F." The housing 24 is designed to allow other external sensors to be connected to the housing 24 or to allow other housings along the height of the tower to be daisy chained together using the power and data cable 18. The housing 24 may also include one or more apertures 48 allowing various sensors to extend therethrough or windows 50 for allowing other sensors to project therefrom. Apertures 48 and windows 50 may be similarly located on GCU 16 (not shown). The GCU 16 is best represented in FIG. 3 and also includes a weather resistant housing 25 that is generally indicated.

The GCU 16 receives power from an external power source 52 (such as the power grid or a solar cell or both). Continuous power is supplied from the external power source 52 to the GCU 16 and along the cable 18 to the sensor unit 14. Data collected by the sensor unit 14 is transmitted by the cable 18 to the GCU 16. The GCU 16 includes a backup battery 54 (such as one or more replaceable gel-cell batteries). The sensor unit 14 is designed to operate continuously with low operating power requirements so as to maximize the time that the backup battery 54 can provide power to the sensor unit 14 in the event of a failure from the external power source 52. The GCU 16 is designed to connect to a variety of other monitoring devices such as an anemometer 56 and a wind vane 58 for measuring wind speed and direction, ice sensors 60, fire detection 62, cameras 64, security devices 66, site equipment or systems monitoring 68, etc. Information from the sensor unit 14 and GCU 16 is sent via a transmitter 70 to a remote server 72 such as a central server and/or a cloud server. The transmitter 70 of the GCU 16 is connected to the remote server 72 via a wireless connection such as a cellular phone connection or via a direct internet connection to transmit processed data from the GCU 16 to a remote computer 74 using Internet of Things (IOT) or similar technology, which can be further processed and analyzed at a remote location.

The components of the sensor unit 14 and the GCU 16 are selected to have both a very high reliability and mean time between failure (MTBF) in both low and high temperature operating conditions and installed on towers 12 subjected to vibrations. Additionally, the only routine maintenance that the monitoring system 10 requires is the periodic replacement of the backup battery 54. Still further, the sensor unit 14 has a relatively low mass and projected area, and thus, its impact on the structural loading of the tower 12 is insignificant regardless of how and where it is mounted on the tower 12.

Figure 4:
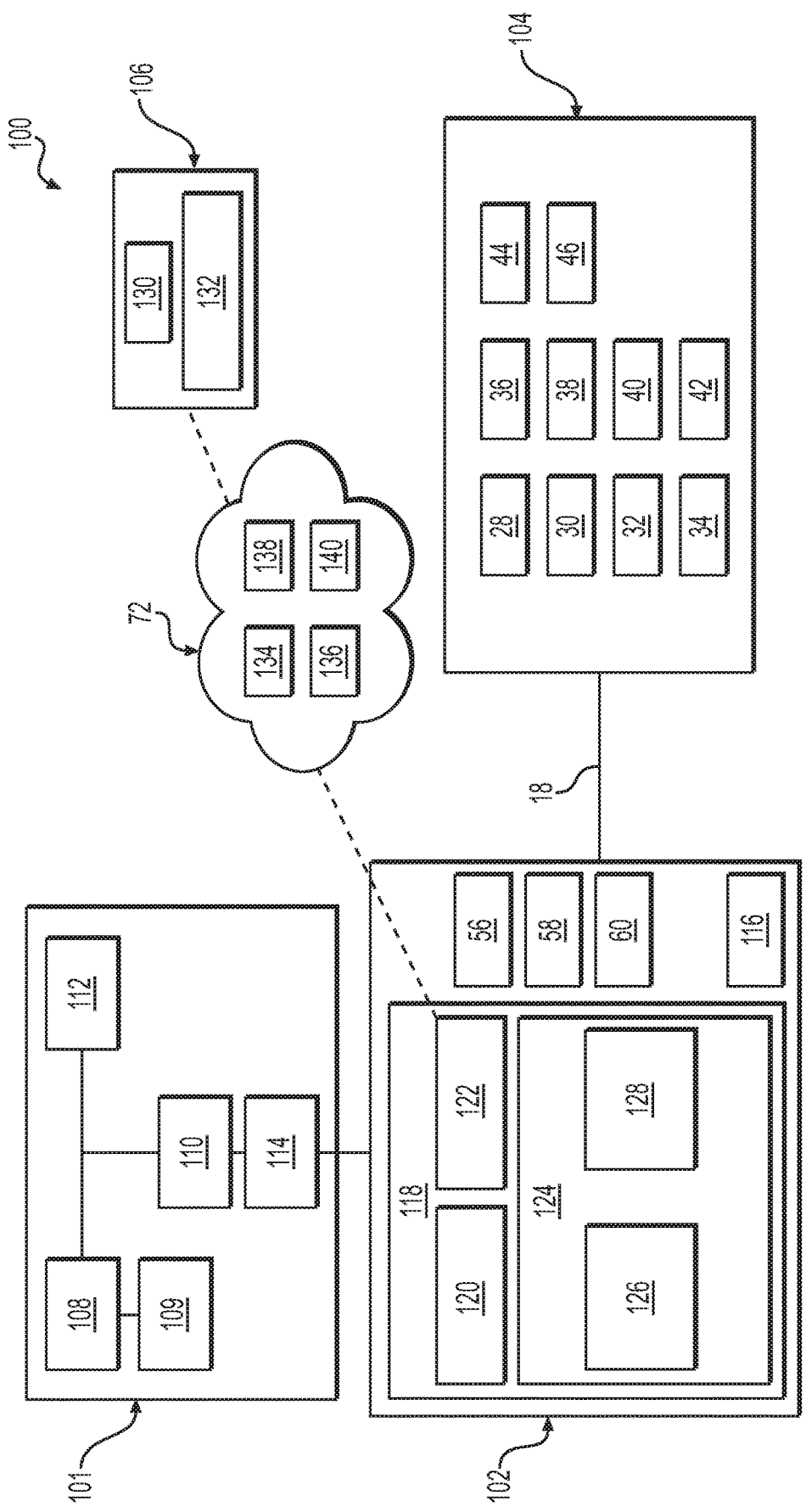
FIG. 4 is a block circuit diagram illustrating various components in the remote tower monitoring system.

Referring now to FIG. 4, an example block diagram of a circuit 100 of the system 10 is shown. The various elements provided therein allow for a specific implementation. Thus, one of ordinary skill in the art of electronics and circuits may substitute various components to achieve a similar functionality. The circuit 100 includes a power system 101, a GCU system 102, a sensor system 104, and a remote computer system 106. The power system 101 includes a power supply circuit 108 (associated with power supply 52) that is monitored via a power supervision circuit 110 and a back-up battery circuit 112 (associated with the back-up battery 54) that is primarily charged via the power supply circuit 108. In certain arrangements, a secondary or back-up power supply circuit 109 may be included such that there is a secondary method of providing a charge to the back-up battery in the event of a power supply circuit 108 failure. For example, the power supply circuit 108 may be a grid and the second power supply circuit 109 may be a solar cell. A power testing unit 114 tests for current from the power supply circuit 108 and/or the secondary power circuit 109 to ensure that power is being transmitted to the GCU 16. In the event of a power failure, the power testing unit 114 may utilize the back-up battery 54 for initiating a protocol wherein a warning is transmitted to the remote computer 74. Moreover, in power failure events wherein the health of the tower 12 can no longer be effectively monitored, a visual alarm unit 116 is located on the GCU system 102 such that it can visually indicate such failure via a flashing LED or the like to warn on-site service people of the unknown status. Operation of the power system 101 includes a controller 118 located in the GCU system 102. The controller 118 includes a processor 120, a communications unit 122 (associated with transmitter 70), and a memory 124 having machine readable non-transitory storage. Programs and/or software 126 are saved on the memory 124 and so is data 128 obtained via the many sensors and detectors. The processor 120 carries out instructions based on the software 126 and data 128, for example, sending a warning to the remote computer 74 if there are irregularities in the responses of the tower 12. Communications between the GCU system 102 and the remote computer system 106 is carried by the communications unit 122, allowing both transmittal and receipt of information. As such, software 126 and data 128 may be updated via instructions from the remote computer system 106. While not limited thereto, example sensors 56, 58, 60 are also shown in the GCU system 102 Sensor system 104 is connected to GCU system 102 with the cable 18 and is shown to include sensors 28 through 46 as just one non-limiting example. Data retrieved by the sensor system 104 can be locally stored in memory 124. In the event of a power failure, the GCU system 102 may preserve the back-up battery 54 by ceasing communications with the remote computer system 106 and storing all the data locally on memory 124 until power is back or overridden from a remote or local service person. The remote computer system 106 may include a controller 130 similar or identical to that of the GCU system 102 and a user interface 132 for user operation. The user interface 132 can include, without limitation, monitor and keyboard, touchscreen, portable tablet device, etc.

Still referring to FIG. 4, the server 72 may be a storage server that that stores various data. For example, data stored in the server 72 may be categorized as historical data 134, real-time data 136, secondary environmental data 138, and tower location data 140. The historical data 134 may be related the movement and permanent displacement of the specific tower 12 and/or a plurality of other towers having similar structure and environmental data recorded from corresponding sensor units of the respective tower or towers. The real-time data 136 may be related to real-time data-capture from the tower or other towers having similar structure and real-time environmental and displacement readings from sensor units of the respective tower or towers. The secondary environmental data 138 can provide real-time and historical environmental data from sources such as weather and geological stations. The tower location data 140 may be related to data from towers within a predefined proximity such that the data can be cross-referenced for discrepancies between towers, particularly when all the towers are being simultaneously subjected to similar environmental factors. The block diagram of the circuit 100 in FIG. 4 is provided as just one example, it should be appreciated that the various sensors, data, controllers, memory, processor, and other components can be located locally in GCU 16, sensor unit 14, and/or the remote computer 74 and/or in other arrangements without removal from the scope of the subject invention. For example, the controller 118 and components may be located at the remote computer 74 or at both the remote computer and the GCU 16.

As explained previously, the server 72 collects information to correlate with the responses of the tower 12 such as wind and ice data obtained from local weather stations and/or locally installed instrumentation and earthquake data from sources such as the US Geological Society (USGS) and/or locally installed accelerometers. This correlation combined with the measured responses of the tower 12 allows for a more accurate analysis of a tower 12 and verify local environmental readings from sensor unit 14. As such, the tower 12 can be closely and accurately monitored for displacement and irregular responses to environmental factors and can also lead to proposed additional loading or fatigue analysis and avoid the need to map and evaluate all supported attachments. The improved analysis is possible because the calculation of forces for a conventional computational analysis involving the inevitably conservative determination of projected areas, appropriate wind drag factors, shielding factors, damping factors, gust effect factors, etc. are not required as the effects of these calculations and factors are captured in the collected data by the monitoring system 10. The measured responses of the tower 12 can be directly input into tower analysis software or be extrapolated to determine the expected stress levels and responses under other loading conditions. The same method can be used to verify the responses of a tower after a changed condition or additional loading has been installed.

The collected data combined with artificial intelligence routines (AI) or software 126 is capable of detecting events of interest (signature events) without human review of vast amounts of data. With this information, the tower monitoring system 10 can identify a range of less common events that could affect the tower, e.g. forces other than from wind, ice and earthquake events. For example, the tower monitoring system 10 of the present invention can identify when a bullet (or another object) impacts the tower; unauthorized activity (such as a person climbing the tower); lightning strikes; galloping or loose guys on guyed mast towers; loose hardware or attachments; and modifications/vandalism to the tower. In addition to providing a tower owner (or operator) with an alert or warning that an event has occurred at the tower, the tower monitoring service can be used to monitor when scheduled work on the tower begins and ends.

Figures 5A, 5B, 5C, 5D:
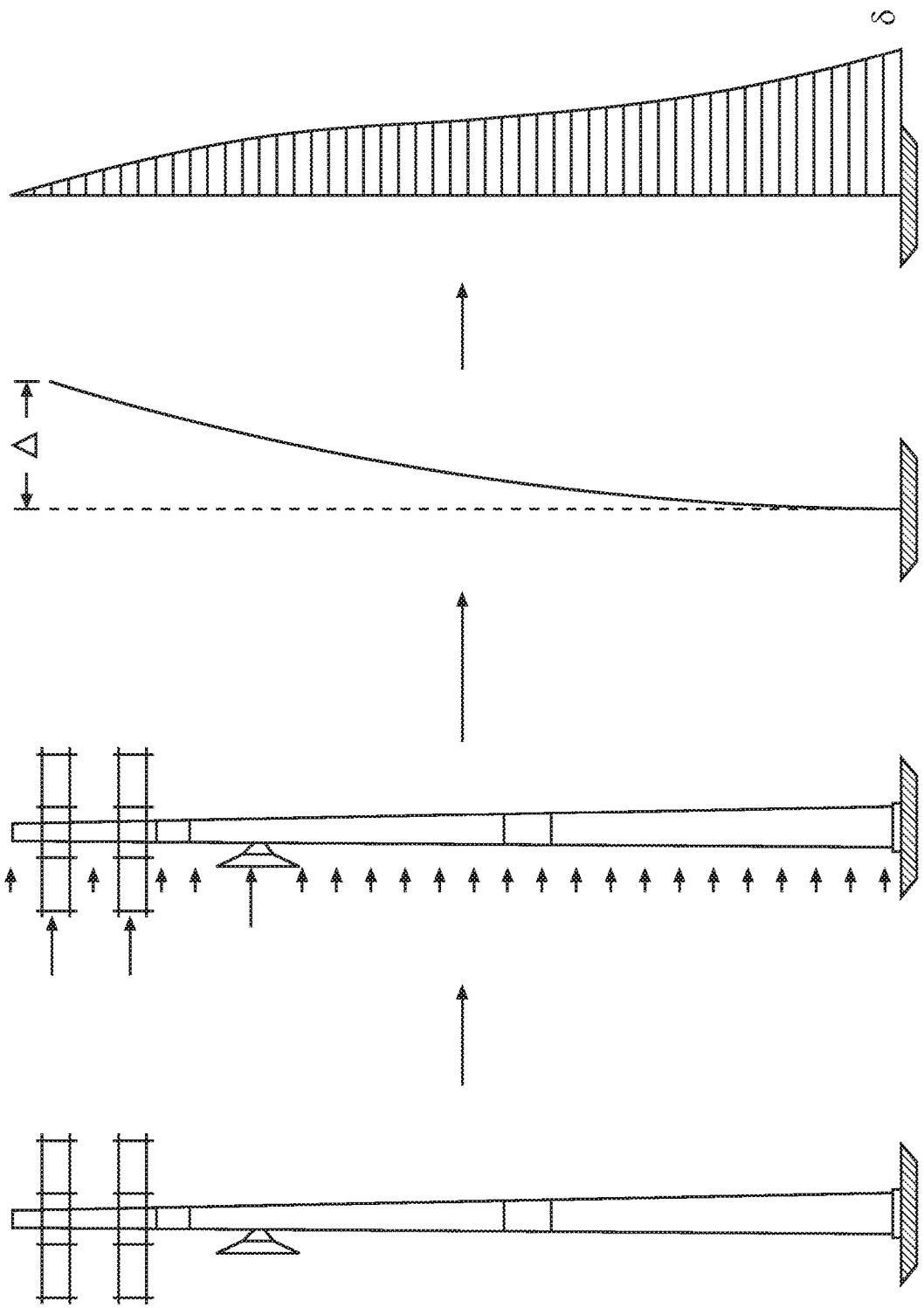
FIGS. 5A through 5D are a series of conventional steps for obtaining a calculation of stresses on the remote tower as a result of wind forces.

FIGS. 5A through 5D are a series of conventional steps for obtaining a calculation of stresses on the remote tower as a result of wind forces. Starting with FIG. 5A, there is a step of on-site mapping of what is on the structure, followed by FIG. 5B which includes a step of determining drag, shielding, and forces. Next, the displacement is calculated as shown in FIG. 5C and from these steps the stresses and reactions are calculated as shown in FIG. 5D. Referring now to FIGS. 6A through 6C, a series of steps in accordance with the subject disclosure are presented. These steps result in obtaining a calculation of stresses or collecting data for a profile on the remote tower as a result of wind forces. Starting with FIG. 6A, the sensor unit 14 collects wind speeds and responses from which displacement can be obtained directly from information collected as shown in FIG. 6B. Following displacement readings, stresses and reactions can be calculated as shown in 6C.

Based on information received from the sensor unit 14 (for example readings from accelerometer, gyroscope, and magnetometer) and the GCU 16, the software 126 may further be configured to perform an analysis (modal or otherwise) to determine and record the magnitude and direction of the various contributions of responses from the modes of oscillation of the tower for structural evaluation or analysis. More particularly, the software 126 is configured to receive and analyze data to determine the magnitude and direction of twist and sway rotations. The software 126 may also include predetermined threshold values such that the detection of responses of a concern to the health or operation to the structure are automatically communicated to the remote computer 74 via executable instructions. In addition to predetermined threshold values, the software 126 can also utilize data, real-time and/or otherwise, to determine the occurrence of destructive oscillations such as vortex shedding and buffeting, permanent deformations due to excessive loading or foundation issues, solar distortions, and structural properties of the tower 12 including stiffness, damping and natural frequencies. All of the aforementioned data can be initially stored in memory 124 and later transmitted or transmitted as real-time data 136 to remote storage such as the server 72.

Figure 7:
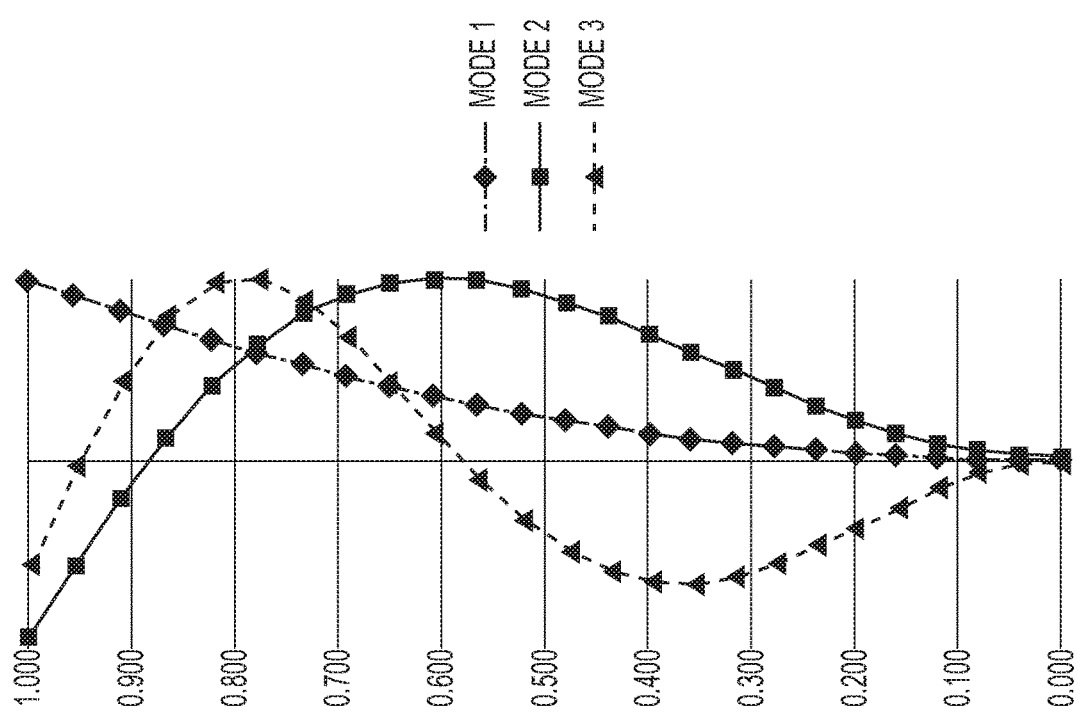
FIG. 7 is a graphical representation of a modal analysis performed by a remote computer in communication with the GCU to evaluate the dynamic responses of the tower to external forces.

FIG. 7 is a graphical representation of an example modal analysis in accordance with one aspect of the present invention. The modal analysis is performed by the remote computer to determine the modes (e.g. Mode 1, Mode 2, or Mode 3) contributing to the responses of a tower to more accurately assess the impact on the health of the structure. In a preferred embodiment, the sensor unit 14 includes a 3-axis accelerometer from which the modes can be extrapolated. Displacement data from the accelerometer and/or other sensors can be used to determine the direction and the magnitude of displacement. The software 126 includes instructions to convert sensor data such as displacement data to a representation in the frequency domain. By-way of example, the software 126 utilizes a Fast Fourier transform or similar algorithms as part of the modal analysis. The frequency representations for Modes 1, 2, and 3 can be viewed separately in order to more accurately measure stresses acting upon the tower by using the mean and oscillating components of displacement determined from the algorithm. These readings are along the principle axes of the structure, i.e., the axes of symmetry. For example, while mode 3 shows a lateral displacement similar to that of mode 1, mode 3 subjects the tower to significantly more stress particularly at the base or lower portion of the tower structure. The modal analysis allows for the proper calculation of stresses in the tower structure. Simply knowing the gross displacements does not allow for an accurate evaluation of stresses on the tower structure. Based on the natural frequency readings of a tower structure, the software 126 may be further implemented to alert an operator if the tower structure is being exposed to environmental factors that match the natural frequency (e.g., vortex shedding or an earthquake), as such, combinations may result in additional stresses to the tower structure that are dangerous or catastrophic. The modal analysis is advantageous as compared to other known tower monitoring systems which are incapable of determining displacements or the mode contribution of each significant mode to the displacements and the impact on the structure. Another unique feature of the modal analysis capability of the present invention is that for a self-supporting tower 12, only one sensor unit 14 can be used to determine the tower responses throughout the entire height of the structure without the need for multiple sensor units positioned at different elevations on the tower. Modal readings can be compared with historical data, for example, via superimposing current/recent modes over previously saved modal readings. Changes in certain modes over time can not only indicate structural fatigue, but can also provide details that will help an operator locate weak points within the structure for preventative care via dampening, additional supporting structure, or relocation of equipment.

Figure 8:
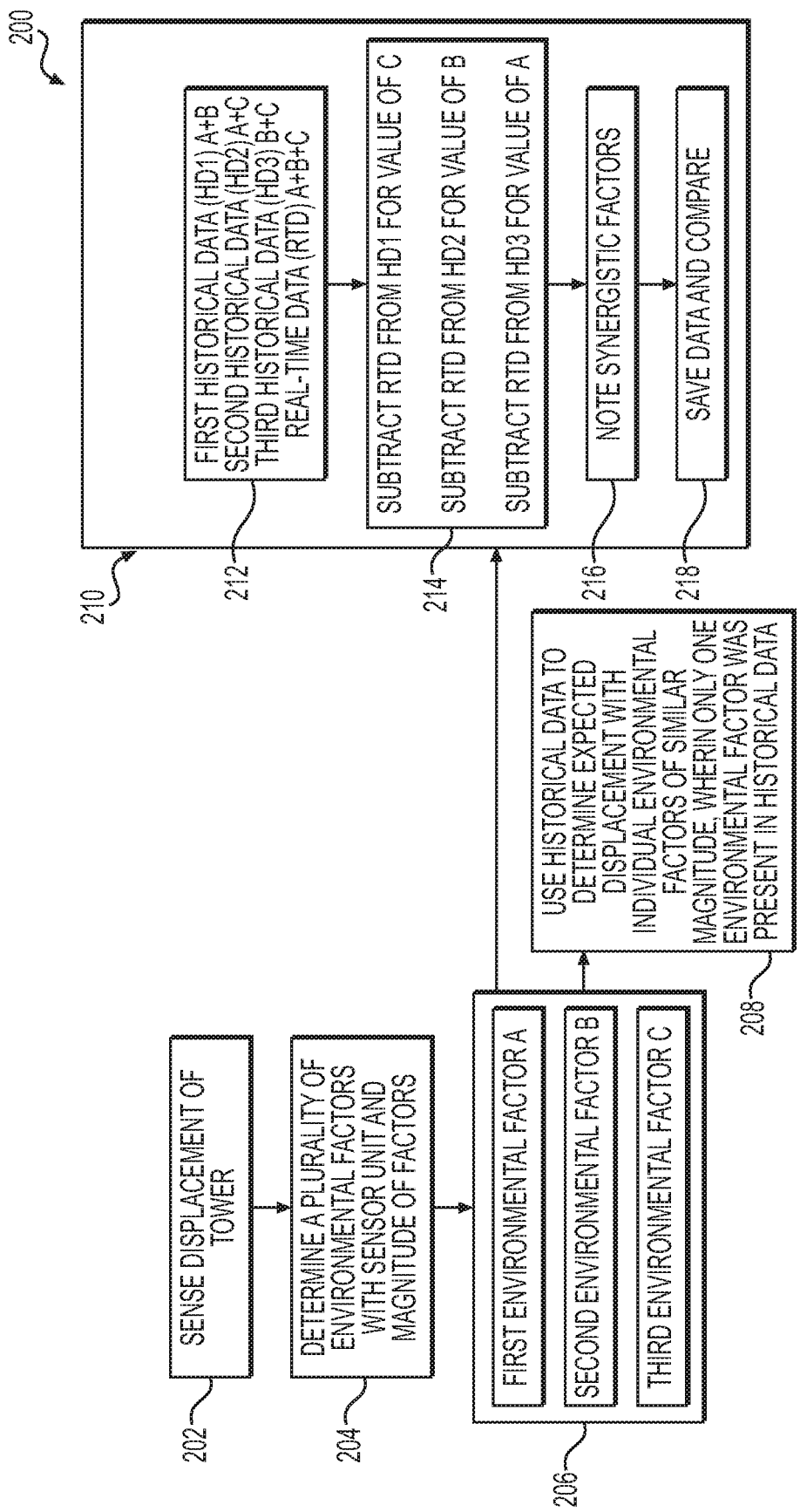
FIG. 8 illustrates various steps performed by the remote tower monitoring system to evaluate the dynamic responses of the tower to external forces.

Referring now to FIG. 8, a trend analysis performed by the remote computer is provided that determines individual environmental contributions to the magnitude of directional displacement of a tower 12 to more accurately assess the impact on the health of the structure. More specifically, FIG. 8 provides a software implemented method 200 of determining the individual contribution of environmental factors that result in the displacement of the tower 12. The method 200 begins with sensing 202 an initial displacement of the tower via a displacement reading from the sensing unit 14. Once displacement occurs, the environmental factors or conditions are determined 204 by environmental readings on the multiple environmental sensors located on the sensing unit 14, GCU 16, other data from remote storage, and/or other local and environmental sources. While determining 204 environmental factors, an associated magnitude reading of each is gathered, e.g., wind speed, precipitation levels, temperature, etc. Real-time data is gathered 206 that illustrates the changes in magnitude of environmental factors and resulting change in displacement of the tower. If historical data exists where only one of the sensed environmental factors was present, at a similar magnitude and acting against a similarly configured tower (or the same tower), a contribution for that factor is determined 208. On the other hand, in situations involving unique combinations of environmental factors, a reduction in environmental factors generally indicated in block 210 may be necessary. In such instances, historical data is gathered 212 wherein some, but not all contributing environmental factors were present, preferably but not necessarily at similar magnitudes and with similarly configured towers (or the same tower). In step 214, the tower readings, such as the magnitude of displacement is subtracted from historical data to isolate specific contributions of each environmental factor. Of course, certain environmental factors will operate synergistically such that the tower response is greater than the sum of their individual responses. As such, discrepancies are noted 216 between the calculated values and the actual values to better understand combinations of environmental factors that are particularly damaging, such as wind and ice. Calculations are saved 218 and cross-referenced in future contribution determinations for accuracy and to further assist in flagging irregular behavior of a tower. For example, if a tower has retained ice, damaging oscillations may occur with wind as determined by the modal analysis.

Figure 9:
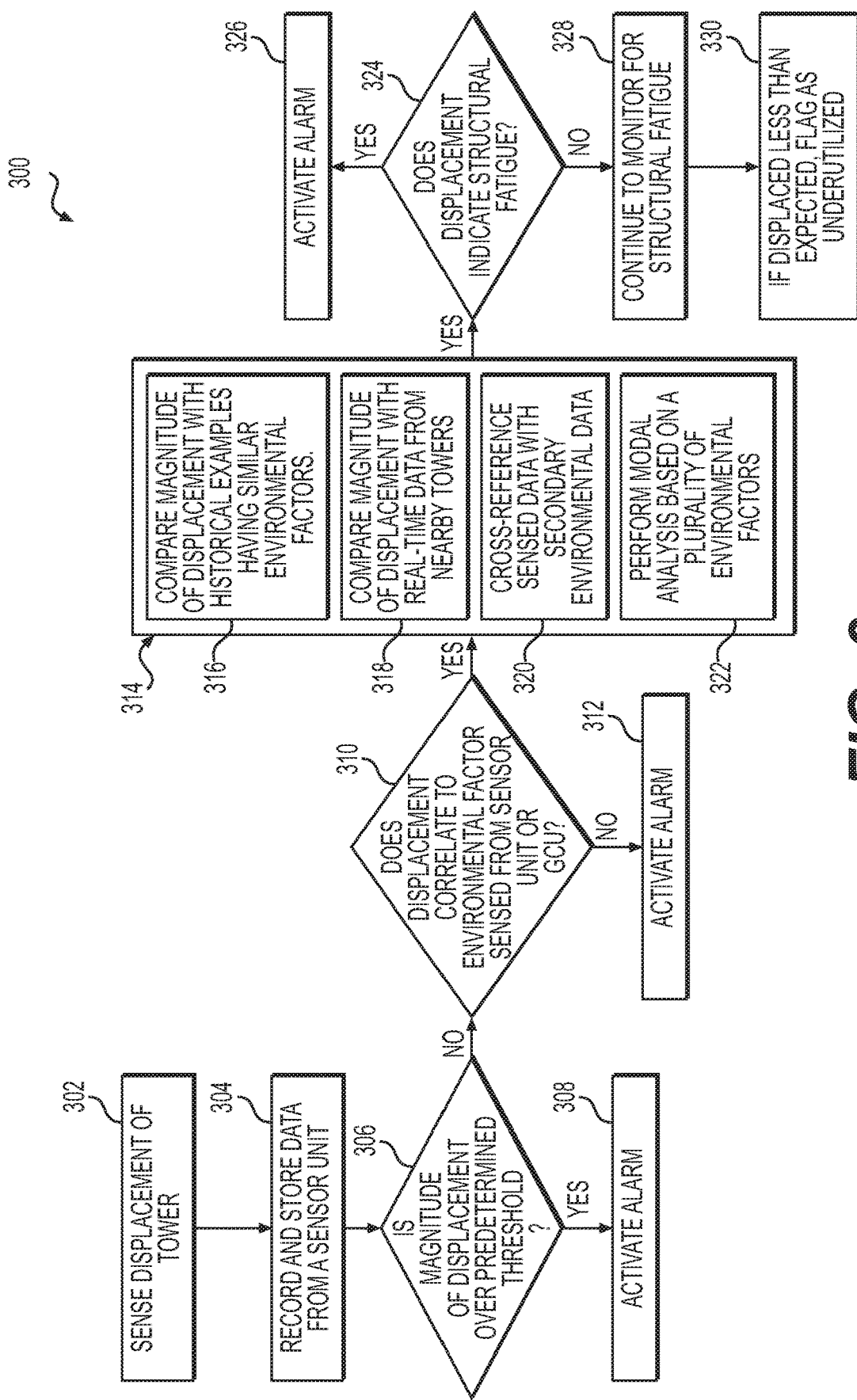
FIG. 9 illustrates various steps performed by the remote tower monitoring system to determine the structural health of the remote tower.

A non-limiting example of a software implemented method 300 of determining irregularities in tower structure is presented in FIG. 9. The method begins by sensing displacement 302 via a displacement reading. Sensed data may be continually recorded 304. Displacement is continually monitored and correlated with environmental data to ensure that it does not exceed a predetermined threshold 306 that is damaging to the health of the tower, the performance of equipment supported by the tower, or otherwise of interest. If the displacement is over the predetermined threshold, the system will activate 308 a corresponding alarm to warn of potential structural failure. If the displacement is not over a predetermined threshold, the system will correlate 310 the displacement with environmental factors, e.g., wind. If no correlating environmental factors are sensed from the sensor unit or the GCU, the alarm will provide 312 a corresponding warning for further investigation. If correlating environmental factors are determined, a comparison 314 of tower response is performed with a secondary source of data as generally indicated for irregularities in tower behavior. The comparison 314 includes searching through the server for instances with similar environmental factors to develop an expected displacement profile of a heathy tower exposed to the same environmental factors to compare to the displacement readings of the tower for irregularities. The comparison 314 to develop an expected displacement profile may include any combination of the internal boxes 316 through 322. More particularly, displacement of the tower may be compared 316 to historical data of towers having a similar configuration and exposed to similar environmental factors; displacement of the tower may be compared 318 to displacement of near-by towers; the software may compare 320 sensed environmental factors with secondary environmental data such as third party data (e.g., weather stations); and the software may perform a modal analysis 322 such as that shown in FIG. 7, which may or may not consider or be based on environmental factors. If one or more comparisons 314 indicate 324 structural fatigue, e.g.,. the displacement readings are a threshold amount more than the expected displacement profile for a given mode, then the system sends a warning 326. If one or more comparisons 314 do not indicate structural fatigue, then the system continues to monitor 328 the tower for structural fatigue. If one or more comparisons 314 indicate 330 underutilization, e.g., the tower is not being displaced as much as the expected displacement profile suggests, the tower is flagged for being underutilized and potentially able to support more equipment. It should be appreciated that comparisons with historical data 316, can include historical data of the same tower, wherein a larger range of displacement experienced under environmental factors that the tower has been previously exposed can be used to indicate the potential structural fatigue damage, the remaining expected life of the tower structure, or other progressive structural issues. Historical data may also include previously performed modal analysis wherein individual modes can be compared to identify structural changes to the tower or its foundation. Moreover, predetermined threshold values related to one or both of frequency and amplitude measurements can be used, wherein a mode reading that exceeds the threshold value activates an alarm or alert protocol. The data stored in the processor may also include mode profiles associated with one or more of vortex shedding, buffeting, etc., that can be compared to the detected modes of the tower 12. Comparisons can be done via any type of software implementing searching including superimposing profiles over the modes of the tower 12. Changes in modes over time can also be monitored and indicate structural damage.

It should further be appreciated that comparisons 314 with historical data 316 and/or real-time data from nearby towers 318 can include a step of averaging displacement measurements over time to develop the expected displacement profile of a healthy tower and activating an alarm if displacement of the tower is a predetermined threshold over that expected. For example, the response of a number or nearby towers may be averaged to determine a more accurate expected displacement. Likewise, for towers having different structure, correlations may be drawn based on historical or real-time data. For example, a larger tower may be shown to be displaced at a rate approximately half of that of the subject tower under similar environmental factors and, as such, correlations between the two behaviors will account for the subject tower reacting approximately twice as much as the larger tower before any irregularities can be concluded. The alarm warning may be local and/or sent to the remote computer 74. Alarm activations like all other data obtained in system 10 can be recorded and stored as historical data for establishing or revising thresholds that generate alarms, etc. All data can be stored remotely and can also permanently, but preferably temporarily be stored locally in GCU 16, the remote server 72, or the remote computer 74.

The tower monitoring system 10 of the present invention provides a wide range of additional benefits to a tower owner. For example, it is able to remotely detect destructive oscillations and changes to the structure by comparing data from before and after a loading event. In real-time (or near real time), the tower monitoring system is also able to compare data from the sensor unit 14, from optional sensors at the tower site, information from weather reporting stations, USGS, etc. against pre-established thresholds and generate alerts when those thresholds are exceeded to alert the tower owner that an inspection or other action may be necessary. The tower monitoring system can also provide periodic "health" reports showing trends of displacement compared to average over a period of time and report permanent deformations to a tower owner and verify responses from additions and/or modifications to the tower. The tower monitoring system can also provide a frequency analysis which can be used to tune one or more structural dampers to control oscillations of the tower.

The tower monitoring system of the present invention is capable of measuring gradual changes, or trends, in responses. Such a trend analysis can be useful to identify problems related to corrosion, loose structural components, vandalism, addition of loading, overloaded towers, the effectiveness of structural modifications, foundation issues, predict the remaining fatigue life of towers subjected to cyclic loading, buckling etc. For example, an irregular behavior of a tower may have been noted previously in the same or a different tower, by having vast amounts of data the system can flag previous similar events to form an initial diagnosis.

The tower monitoring system is able to identify underutilized structures, which can be potential revenue opportunities for the tower owner; optimize and potentially extend required structural inspection intervals; reduce service trips based on public inquiries/concerns; reduce post storm management costs and efficiently address damaged towers by only directing crews to towers that generated alerts that critical thresholds were exceeded; identify overloaded structures; and increase the reliability of services supported by a tower and lower insurance premiums.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other. For example, the monitoring system can be used for continuous monitoring over the life of a tower or for short term monitoring to obtain desired specific information. For sensor units that are not installed in high radio frequency energy environments, the sensor unit can be assembled with its own power source and means to transmit data by wireless communications or by direct connections to the internet at the site without the need for a cable and a GCU. The server, the controller, and remote computer can be embodied in several different ways without departing from the scope of this disclosure. Unless otherwise indicated "real-time" can refer to near real-time wherein the delay is only seconds or a few minutes and can also refer to continuous receiving and transmitting of data readings. It should also be appreciated that unless otherwise indicated the list of example sensors/detectors on the GCU 16 and example sensors on the sensor unit 14 could all be located at either the GCU 16 or sensor unit 14 or arranged in various combinations between the two without departing from the scope of the subject disclosure. Such variations are not to be regarded as a departure from the disclosure, and all such modifications are intended to be included within the scope of disclosure.

What is claimed is:

1. A tower monitoring system, comprising:
a sensor unit for attachment to a tower and having at least one displacement sensor to obtain displacement readings reference to principle axes of a structure;
a remote server in communication with the sensor unit for receiving and saving the displacement readings; and
a processor configured to review the displacement readings and perform a modal analysis that separates mean displacement from the displacement readings due to at least one mode of oscillation of the tower.

2. The tower monitoring system of claim 1, wherein the processor converts the displacement readings into the at least one mode as a frequency representation.

3. The tower monitoring system of claim 2, wherein the at least one mode includes a first mode and a second mode, the first mode including the natural frequency.

4. The tower monitoring system of claim 3, wherein the second mode includes one of lateral displacement, twist rotations, and sway rotations.

5. The tower monitoring system of claim 3, further including a third mode different than the first mode and the second mode.

6. The tower monitoring system of claim 3, wherein the processor is further configured to perform a trend analysis of the first mode and generate an alarm upon a change in the natural frequency.

7. The tower monitoring system of claim 2, wherein the remote server includes predetermined threshold values and the processor is further configured to compare the at least one mode to the predetermined threshold values and generate an alarm if the predetermined threshold value is exceeded.

8. The tower monitoring system of claim 2, wherein the remote server includes historical data related to previously performed modal analysis that the processor compares to the at least one mode.

9. The tower monitoring system of claim 2, wherein the processor is further configured to perform a trend analysis of the at least one mode over a period of time generate an alarm upon a frequency change of the at least one modes over time in response to similar stresses.

10. The tower monitoring system of claim 1, including a ground control unit (GCU) in electrical communication with the sensor unit for wirelessly transmitting the displacement readings to the remote server.

11. The tower monitoring system of claim 10, wherein the GCU includes an external power source for providing electricity to the sensor unit and further includes a back-up battery circuit for use upon failure of the external power source.

12. The tower monitoring system of claim 1, wherein the processor is further configured to determine the static properties and dynamic properties of the tower that include at least one of stiffness, natural frequency, and dampening.

13. The tower monitoring system of claim 12, wherein the processor accounts for environmental conditions.

14. The tower monitoring system of claim 1, including an inclinometer to detect permanent deformation of the tower.

15. The tower monitoring system of claim 1, wherein the processor is located at a remote computer that receives data from the remote server.

16. The tower monitoring system of claim 1, wherein the processor is further configured to perform a trend analysis of the displacement readings over a period of time and alert a tower operator upon a magnitude of displacement that progressively increases in response to similar stresses.

17. The tower monitoring system of claim 1, wherein the remote server includes mode profiles related to at least one of vortex shedding, buffeting, and permanent deformations.

18. The tower monitoring system of claim 17, wherein the processor is further configured to compare the at least one modes with the mode profiles.

19. The tower monitoring system of claim 1, wherein the displacement sensor includes a accelerometer, gyroscope, and magnetometer.

20. The tower monitoring system of claim 1, wherein the processor is further configured to correlate environmental factors and predetermined thresholds of displacement associated with the environmental factors, wherein an alarm is generated when the displacement exceeds the predetermined threshold.

* * * * *